United States Patent [19]

Kuroiwa et al.

[11] 4,366,524

[45] Dec. 28, 1982

[54] ELECTROMECHANICAL TRANSDUCER CONTROLLING DEVICE

[75] Inventors: Hiroshi Kuroiwa; Takao Sasayama, both of Hitachi, Japan

[73] Assignee: Hitachi, Ltd., Tokyo, Japan

[21] Appl. No.: 152,666

[22] Filed: May 23, 1980

Related U.S. Application Data

[63] Continuation of Ser. No. 891,003, Mar. 28, 1978, abandoned.

[30] Foreign Application Priority Data

Mar. 31, 1977 [JP] Japan ................................. 52/35253

[51] Int. Cl.³ ............................................. F16K 31/06
[52] U.S. Cl. .................................. 361/154; 361/208; 123/329
[58] Field of Search ............... 361/154, 152, 208, 203; 123/32 AB, 32 EJ, 32 EA; 251/129, 141

[56] References Cited

U.S. PATENT DOCUMENTS

| | | | |
|---|---|---|---|
| 3,659,631 | 5/1972 | Rakoske | 251/141 |
| 3,725,747 | 4/1973 | Cowan | 361/154 |
| 3,745,420 | 7/1973 | Hafner | 361/203 X |
| 3,870,931 | 3/1975 | Myers | 361/210 X |

OTHER PUBLICATIONS

"Pulse-Width Modulation of Magnets," T. L. Wells, *IBM Technical Disclosure Bulletin*, vol. 21, No. 3, Aug. 1978.

*Primary Examiner*—G. Z. Rubinson
*Assistant Examiner*—L. C. Schroeder
*Attorney, Agent, or Firm*—Antonelli, Terry and Wands

[57] ABSTRACT

A device for controlling an electromechanical transducer such as a proportional electromagnetic valve, in which a pulse signal having a constant period shorter sufficiently than the minimum response time required for the displacement of the plunger of the proportional electromagnetic valve over its predetermined full stroke is applied to the electromagnetic coil of the proportional electromagnetic valve to superpose a very small vibratory stroke component on the stroke of the plunger, and the duty cycle of the pulse signal applied to the electromagnetic coil is varied so as to urge the plunger in directly proportional relation to the variation of the duty cycle without substantially giving rise to mechanical hysteresis in the stroke of the plunger.

12 Claims, 22 Drawing Figures

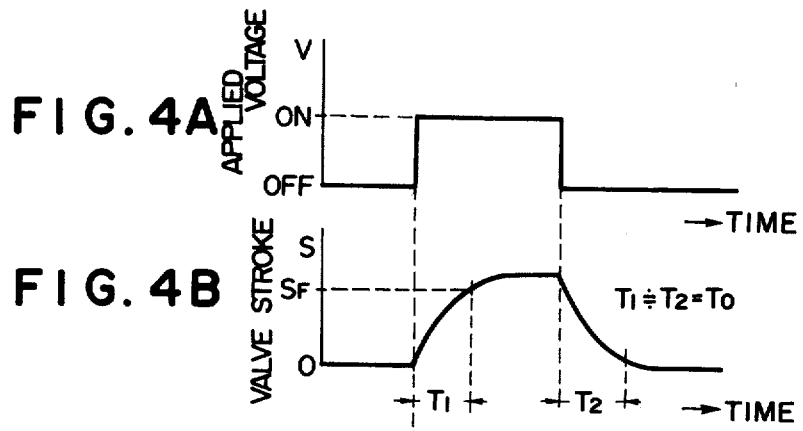
FIG. 4A
FIG. 4B
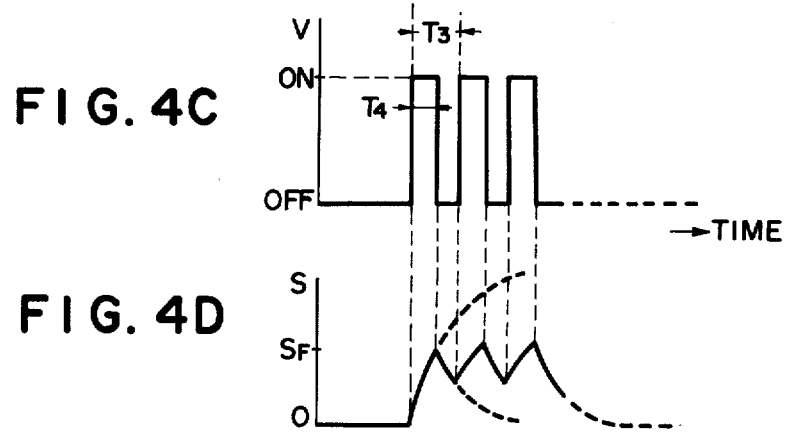
FIG. 4C
FIG. 4D
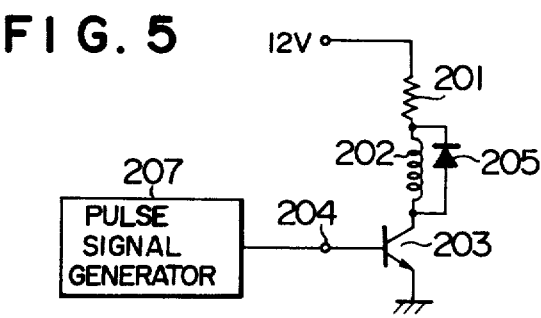
FIG. 5

ELECTROMECHANICAL TRANSDUCER CONTROLLING DEVICE

This is a continuation of application Ser. No. 891,003, filed Mar. 28, 1978, now abandoned.

LIST OF PRIOR ART REFERENCES (37 CFR 1.56 (a))

The following reference is cited to show the state of the art:
U.S. Pat. No. 3,981,288—Wolf Wessel—Sept. 21, 1976—123-139

BACKGROUND OF THE INVENTION

This invention relates to a device for controlling an electromechanical transducer delivering a mechanical quantity as its output corresponding to the magnitude of an electrical quantity applied as its input, and more particularly to a control circuit for accurately driving a proportional electromagnetic valve as instructed by an electrical instruction signal.

As the regulations on the toxic components in the exhaust gas of internal combustion engines of motor vehicles have been made more rigorous in recent years, there has arisen a demand for an exhaust gas purification system which can quickly and accurately remove the toxic components in the exhaust gas without appreciable aging and with high reliability. In an effort to comply with this demand, various exhaust gas purification systems have been proposed, and as a consequence of extensive researches and studies by the parties concerned, the exhaust gas purification systems have been steadily developed to the practically usable stage. Among the proposed and developed systems, the control systems including means for ensuring the reliability and reproducibility of control and capable of compensating the aging and other problems are considered most promising. A closed-loop control system controlling the air-fuel ratio in the carburetor utilizing a ternary catalyst, and an engine combustion control system utilizing a microcomputer for the air-fuel ratio control are examples of the promising control systems. In such a control system, an electromechanical transducer is essentially required which can quickly and accurately respond to an instruction signal applied from a control circuit. A variety of such electromechanical transducers are presently under investigation by the parties concerned and include:

(1) An electromechanical transducer (a proportional electromagnetic valve) delivering a mechanical quantity as its input corresponding to the magnitude of an electrical quantity applied as its input;

(2) an electromechanical transducer (an on-off electromagnetic valve) delivering a mechanical quantity as its output which takes either a minimum value or a maximum value depending on whether an electrical quantity applied as its input has a level higher or lower than a predetermined threshold level; and (3) an electromechanical transducer in the form of a servomotor or a stepping motor.

The electromechanical transducer in (3) includes the problems of high cost, low control accuracy, slow response, etc. compared with those in (1) and (2), and investigations on the electromechanical transducers in (1) and (2) are presently extensively being done.

However, the electromechanical transducers in (1) and (2) include also their own peculiar problems. The electromechanical transducer in (1), or the proportional electromagnetic valve, includes the following problems:

(a) The proportional electromagnetic valve is the electromechanical transducer which delivers a mechanical quantity, that is, displacement or force as its output corresponding to the magnitude of an electrical quantity, that is, current supplied as its input. It is therefore necessary to subject an output signal of its control circuit to digital-analog (D-A) conversion when a digital means such as a microcomputer is used therewith.

(b) Hysteresis tends to occur in the mechanical quantity, and the accuracy of control tends to be reduced. The term "hysteresis in the mechanical quantity" is used herein to denote such a phenomenon that the position of the plunger of the electromagnetic valve responding to a constant current value supplied to the electromagnetic coil differs depending on whether the plunger makes an advancing stroke or a retracting stroke. It will thus be obvious that this hysteresis impairs the performance of the proportional electromagnetic valve.

(c) Means for counterbalancing the electromagnetic force, that is, a spring system is used to provide the mechanical quantity corresponding to the electrical quantity. Consequently, the proportional electromagnetic valve tends to be adversely affected by disturbance such as vibration externally impacted thereto.

On the other hand, the electromechanical transducer in (2), or the on-off electromagnetic valve, includes the following problems:

(d) The on-off electromagnetic valve is the electromechanical transducer which delivers a mechanical quantity, that is, displacement as its output which takes a minimum value or a maximum value depending on whether an electrical quantity applied as its input has a level higher or lower than a predetermined threshold level. That is, the on-off electromagnetic valve has such a property that it does not produce any mechanical displacement unless a predetermined electrical quantity is applied as its input. In order to derive the mechanical quantity corresponding to the electrical quantity, therefore, it is necessary to control the duty cycle of the electrical quantity applied to the on-off electromagnetic valve for directly controlling a pressure, for example, the differential pressure across the air jet, or to utilize a pressure medium, for example, the engine suction vacuum or Venturi vacuum as an actuating source and control the magnitude of this actuating source for indirectly controlling a pressure responsive means such as a diaphragm means which converts a pressure into a mechanical quantity such as displacement. Therefore, even when the electrical quantity applied to the on-off electromagnetic valve as its input exceeds the predetermined threshold level within a short period shorter than the minimum response time required for the mechanical quantity (displacement) to reach its maximum value from its minimum value, the on-off electromagnetic valve cannot mechanically follow the variation of the input within such a short period, and no variation occurs in the mechanical quantity. Thus, the mechanical quantity does not vary in the region in which the on-off period ratio, that is, the duty cycle of the electrical quantity input is small, and a dead zone of control results. This dead zone will be explained with reference to FIG. 1. Suppose that TB and TA represent the on-state period of a voltage V applied to the on-off electromagnetic valve, and one cycle of the applied voltage V respectively. Then, the stroke of the plunger of the electromagnetic valve is zero, that is, the plunger makes no displacement when the on-state period TB is short, or when the duty cycle is small. The dead zone appears in such a case.

(e) Due to the continual reciprocating movement of the means for transmitting the mechanical quantity, for example, the needle valve member between the minimum value and the maximum value of its full stroke, considerable material wear occurs at the parts such as the bearing, valve seat and stopper engaged and struck by the needle valve member, and a considerable crashing sound is also produced at the parts struck by the needle valve member.

(f) Since the duty cycle of the electrical quantity applied to the on-off electromagnetic valve is controlled to control the mechanical output of the valve between its minimum value and its maximum value, vibration or pressure ripple tends to occur in the final mechanical quantity, for example, the air jet negative pressure.

As pointed out above, both the proportional electromagnetic valve in (1) and the on-off electromagnetic valve in (2) have included their own peculiar problems, and it has been demanded to make further improvements to obviate these problems of the electromechanical transducers so that the transducers can be reliably used in motor vehicles for various control purposes.

SUMMARY OF THE INVENTION

It is a primary object of the present invention to obviate the prior art problems pointed out above and to provide a novel and improved control device for an electromechanical transducer of the kind which provides a mechanical output proportional to an electrical input quantity so that such a transducer can respond accurately to the input.

The present invention is applied specifically to the control of the electromechanical transducer or the proportional electromagnetic valve described in (1) and is featured by the provision of control means which controls an electrical input signal to the electromechanical transducer as follows:

(a) The transducer is controlled by a cyclic electrical input signal so as to alleviate the material wear due to the striking of the sliding parts against the associated parts and to reduce the level of the crashing sound.

(b) On-off of the electrical quantity applied as the input to the transducer is repeated at a constant period shorter than the minimum response time required for the full stroke of the plunger urged by the mechanical output of the transducer, and the duty cycle of the electrical input is controlled so as to provide an analog mechanical output or quantity, for example, displacement which can be controlled by a digital electrical signal.

(c) By virtue of the manner of control described in (b), the analog mechanical quantity includes a very small digital quantity component or a very small vibratory stroke component which is effective in eliminating the hysteresis occurring in the mechanical output of the transducer.

(d) Two switching elements are provided for the cyclic on-off of the electrical quantity applied to the transducer, and electrical signals having opposite duty cycles such that one of them is in its on-state while the other is in its off-state are applied to these two switching elements respectively. Therefore, current supplied to the member or the coil generating an electromagnetic force corresponding to the magnitude of the electrical quantity input can flow in either the positive direction or the negative direction depending on the ratio between the duty cycles of the electrical inputs applied to the respective switching elements so as to provide the analog mechanical quantity, for example, the displacement of both the positive direction and the negative direction.

(e) Application of the control means in (b) as an actuating means for the closed-loop air-fuel ratio in a carburetor utilizing a ternary catalyst can minimize the hysteresis in the mechanical quantity thereby improving the accuracy of control of the air-fuel ratio. In addition, elimination of the necessity for digital-analog (D-A) conversion can reduce the cost of the electrical circuit and improve the reliability of the electrical circuit.

(f) Application of the control means in (b) as an actuating means for the control of the recycled exhaust gas quantity in an engine combustion control system provided with a microcomputer can minimize the hysteresis in the mechanical quantity thereby improving the accuracy of control of the recycled quantity of exhaust gas. In addition, elimination of the necessity for D-A conversion can reduce the cost of the electrical circuit and improve the reliability of the electrical circuit.

(g) Application of the control means in (b) as a means for controlling the air-fuel ratio in an engine combustion control system provided with a microcomputer can attain the effect similar to that described in (e).

BRIEF DESCRIPTION OF THE DRAWINGS

FIG. 4A shows the waveform of a voltage applied generally as an input to such an electromagnetic valve.

FIG. 4B shows the stroke response characteristic of the plunger of such an electromagnetic valve responding to the input voltage shown in FIG. 4A.

FIG. 4C shows the waveform of a control signal voltage having a period $T_3$ shorter than the time $T_1$ required for the full stroke of the plunger of the electromagnetic valve, such a voltage waveform being employed for the control by the control device according to the present invention.

FIG. 4D shows the stroke characteristic of the plunger of the electromagnetic valve responding to the voltage input signal shown in FIG. 4C.

FIG. 5 is a circuit diagram of an embodiment of the control device according to the present invention.

FIGS. 10 to 15 show applications of the control device according to the present invention to various control systems, wherein:

FIG. 10 is a system diagram of a control system in which the control device according to the present invention is used as an actuating means for the closed-loop air-fuel ratio control in a carburetor utilizing a ternary catalyst;

FIG. 11 is a partly sectional side elevational view of part of a control system in which a single electromagnetic valve controlled by the control device according to the present invention is used to control a plurality of metering jets;

FIG. 12 is a system diagram of an engine combustion control system provided with a microcomputer, in which the control device according to the present invention is used as an actuating means for the control of the recycled exhaust gas quantity;

FIG. 13 is a system diagram of part of a control system in which an electromagnetic valve controlled by the control device according to the present invention is used to control a pressure thereby controlling the flow rate of fluid;

FIG. 14 is a system diagram of part of a control system in which the electromagnetic force generated by an electromagnetic valve controlled by the control device according to the present invention is used to counterbalance the force of a return spring in a pressure regulating valve; and FIG. 15 is a system diagram of a mechanical fuel injection system in which an electromagnetic valve controlled by the control device according to the present invention is used to control the quantity of fuel.

DESCRIPTION OF THE PREFERRED EMBODIMENTS

Figure 2:
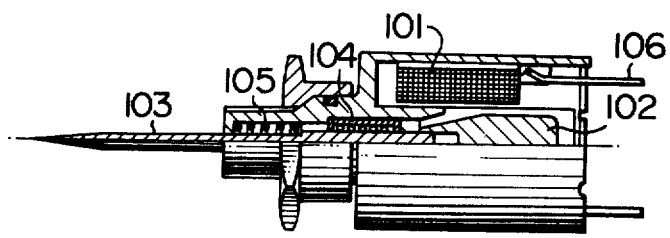
FIG. 2 is a partly sectional side elevational view showing the structure of a so-called plunger type proportional electromagnetic valve.
Figure 3:
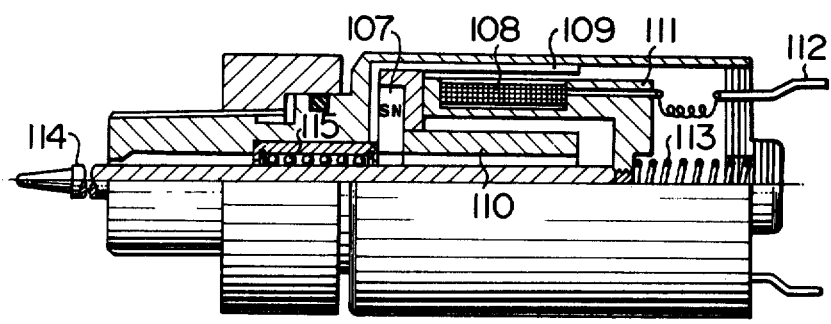
FIG. 3 is a partly sectional side elevational view showing the structure of a so-called moving-coil type proportional electromagnetic valve.

FIGS. 2 and 3 show schematically the structure of two types of the aforementioned proportional electromagnetic valve, that is, FIG. 2 shows the structure of a so-called plunger type proportional electromagnetic valve, and FIG. 3 shows the structure of a so-called moving-coil type proportional electromagnetic valve.

Referring to FIG. 2, the so-called plunger type proportional electromagnetic valve is shown comprising a coil 101 for generating an electromagnetic force, a plunger 102 making displacement proportional to the electromagnetic force generated by the coil 101, a needle valve member 103 following the displacement of an associated plunger 102 for controlling the open area of an associated controlled element, a bearing 104 for ensuring smooth reciprocating movement of the needle valve member 103, a coil spring 105 for stably holding the plunger 102 in its initial position and counter balancing the electromagnetic force generated by the coil 101 to determine the displaced position of the plunger 102, and an external terminal 106 for supplying current to the coil 101.

Referring to FIG. 3, the so-called moving-coil type proportional electromagnetic valve is shown comprising a magnet 107 for generating a magnetic field, an outer yoke 109 and an inner yoke 110 for directing part of the magnetic field generated by the magnet 107 toward a coil 108, a coil bobbin 111 for fixedly carrying the turns of the coil 108 wound therearound, an external terminal 112 for supplying current to the coil 108, a coil spring 113 for counterbalancing the force generated by the coil 108 to permit proportional displacement of the coil 108 and coil bobbin 111 (both of which will be generally referred to as a moving coil hereinafter), a needle valve member 114 following the displacement of the moving coil for controlling the open area of an associated controlled element, and a bearing 115 for ensuring smooth reciprocating movement of the needle valve member 114.

Such electromagnetic valves have a response characteristic as shown in FIGS. 4A and 4B. When a step voltage as shown in FIG. 4A is applied to the coil of such an electromagnetic valve, the electromagnetic valve responds to the applied voltage with a stroke characteristic as shown in FIG. 4B. It will be seen from FIG. 4B that a time lag of first order $T_1$ occurs in the stroke of the plunger or needle valve member due to the delayed response during the rise time of current supplied to the coil 101 or 108 of the electromagnetic valve and also due to, for example, the resistance of the bearing 104 or 115 against the sliding movement of the needle valve member 103 or 114. When the step voltage applied to the electromagnetic valve disappears, the current supplied to the coil 101 or 108 of the electromagnetic valve is also stepped down to the zero level, and in this case too, a time lag of first order $T_2$ appears also in the stroke of the plunger or needle valve member of the electromagnetic valve due to, for example, the repulsive force of the coil spring 105 or 113. These time lags $T_1$ and $T_2$ will take various values depending on the factors including the number of turns and wire diameter of the coils and the spring constant of the coil springs in the electromagnetic valves. In most of commonly employed electromagnetic valves of the types above described, the time lag $T_1$ is approximately equal to the time lag $T_2$ or $T_1 \approx T_2$. In the present specification, a symbol $T_0$ is used to generally represent $T_1$ and $T_2$.

FIG. 5 is a circuit diagram of an embodiment of the control device of the present invention which is preferably used for the control of a proportional electromagnetic valve having such a first-order time lag characteristic. FIGS. 4C, 4D and FIGS. 6A, 6B, 6C show operating waveforms at various parts of the electromagnetic valve when the duty cycle of a pulse voltage applied to the electromagnetic valve is varied.

Figure 6A:
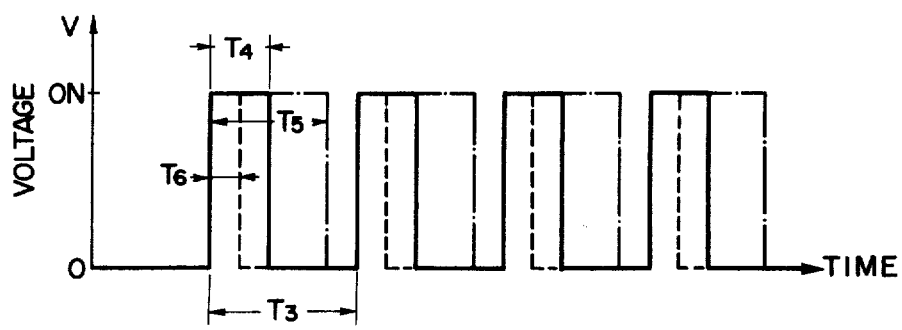
FIG. 6A is a control signal waveform diagram similar to FIG. 4C employed for the control of the electromagnetic valve by the control device according to the present invention, but showing three different on-state periods $T_4$, $T_5$ and $T_6$ for the same period $T_3$.
Figure 6B:
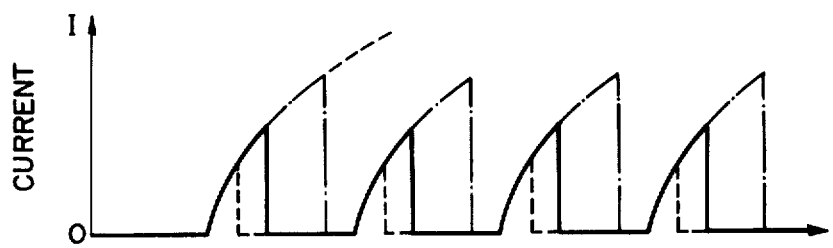
FIG. 6B is a waveform diagram of current supplied to the coil of the electromagnetic valve to show three different current waveforms corresponding respectively to the three signal waveforms shown in FIG. 6A.
Figure 6C:
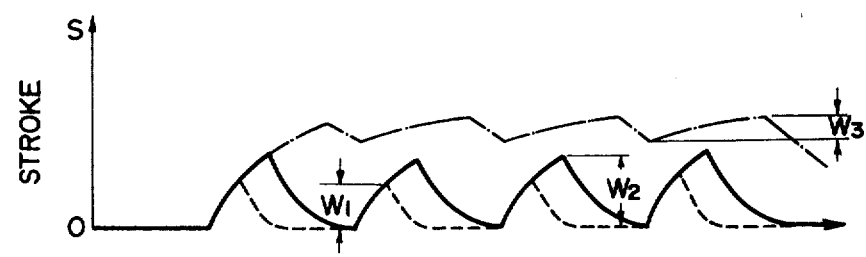
FIG. 6C is a waveform diagram of the stroke of the plunger of the electromagnetic valve to show three different stroke waveforms corresponding respectively to the voltage and current waveforms shown in FIGS. 6A and 6B.

The structure and operation of the circuit shown in FIG. 5 will be described at first. Referring to FIG. 5, a pulse signal generator 207 capable of generating a pulse voltage having a variable pulse width (which generator is commonly known per se) is connected with an input terminal 204. A transistor 203 is turned on in response to the application of the voltage to the input terminal 204, and a DC voltage of, for example, 12 volts is applied from a DC power source through a resistor 201 to the coil 202 of the electromagnetic valve. A diode 205 is connected in parallel with the coil 202. FIG. 4C shows, by way of example, the waveform of the pulse voltage V applied to the input terminal 204, and FIG. 4D shows the stroke characteristic of, for example, the plunger or needle valve member of the electromagnetic valve when the valve responds to the pulse voltage V having the waveform shown in FIG. 4C. In an ordinary proportional electromagnetic valve, $T_0$ is about 15 to 20 msec. Suppose now that the pulse interval or period of the pulse voltage V applied to the electromagnetic valve is set at $T_3$ (FIG. 4C) shorter than $T_0$, then, the duty cycle is given by $T_4/T_3$ as will be readily seen in FIG. 4C. In this case, the stroke characteristic of the plunger or needle valve member of the electromagnetic valve is as shown in FIG. 4D. The value of the applied voltage V shown in FIG. 4C differs from that shown in FIG. 4A in order to attain the equality between the full stroke value $S_F$ shown in FIG. 4D and that shown in FIG. 4B. When the duty cycle is varied to, for example, $T_5/T_3$ and $T_6/T_3$ as shown by the one-dot chain line and dotted line respectively in FIG. 6A, the current I supplied to the coil of the electromagnetic valve makes corresponding variations as shown in FIG. 6B, and the stroke S of the plunger or needle valve member of the electromagnetic valve makes also corresponding variations as shown in FIG. 6C. It will be seen from FIGS. 6A, 6B and 6C that the amplitude of vibration in the stroke of the plunger or needle valve member of the electromagnetic valve is $W_1$, $W_2$ and $W_3$ when the duty cycle is $T_6/T_3$ (shown by the dotted line), $T_4/T_3$ (shown by the solid line) and $T_5/T_3$ (shown by the one-dot chain line) respectively. It will thus be seen that the amplitude of vibration in the stroke is smaller when the duty cycle is $T_6/T_3$ and $T_5/T_3$ than when the duty cycle is $T_4/T_3$. This fact is also illustrated in FIG. 7C described later.

Thus, the effective value of current supplied to the coil of the electromagnetic valve can be varied by varying the duty cycle, and the stroke of the plunger or needle valve member of the electromagnetic valve can also be varied, and yet its vibration can be maintained always at a very small amplitude ($W_1$, $W_2$, $W_3$). This very small amplitude of vibration ($W_1$, $W_2$, $W_3$) decreases gradually as the value of the period $T_3$ is decreased relative to that of the time lag $T_0$, and the very small amplitude of vibration approaches a value very close to zero when the frequency is, for example, about 200 Hz, that is, when the period $T_3$ is about 5 msec. The very small amplitude of vibration ($W_1$, $W_2$, $W_3$) shown in FIG. 6C is depicted as having a considerably large value since the period $T_3$ is supposed to be considerably long relative to the time lag $T_0$. It is to be added that the drawing is prepared under the consideration that exaggerated illustration of the very small amplitude of vibration on the drawing will facilitate the understanding of the basic principle of the present invention.

Means for providing a variable pulse width of the pulse signal generated by the pulse signal generator 207, that is, means for providing a variable duty cycle is already commonly known in the art, and therefore, such means is not especially illustrated.

Figure 7A:
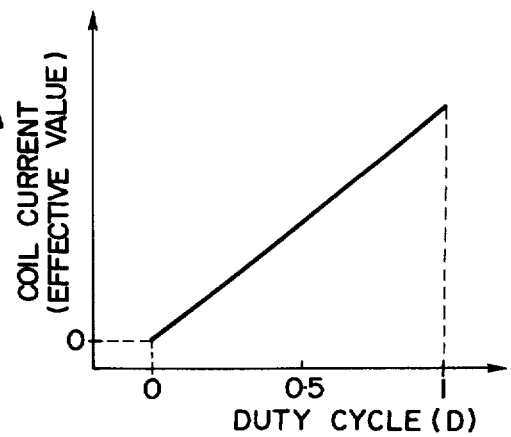
FIG. 7A is a graph showing the relation between the duty cycle and the coil current of the electromagnetic valve controlled by the control device according to the present invention.
Figure 7B:
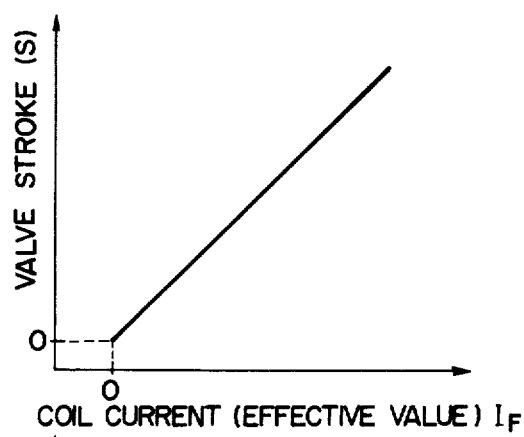
FIG. 7B is a graph showing the relation between the coil current and the stroke of the plunger of the electromagnetic valve controlled by the control device according to the present invention.
Figure 7C:
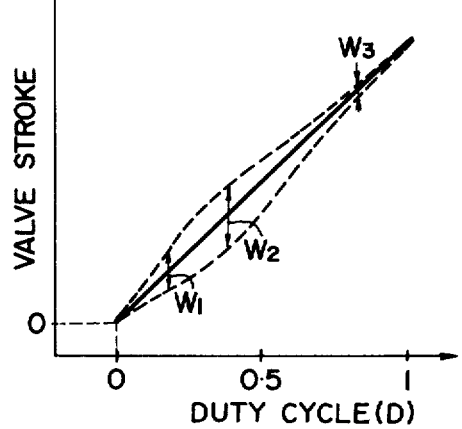
FIG. 7C is a graph showing the relation between the duty cycle and the stroke of the plunger of the electromagnetic valve controlled by the control device according to the present invention.

FIG. 7A shows the relation between the duty cycle and the effective value $I_F$ of current supplied to the coil of the proportional electromagnetic valve shown in FIG. 2 or 3 when the input voltage applied to the electromagnetic valve has a constant period of, for example, $T_3$ shorter than the minimum response time $T_0$ required for the displacement of the plunger or needle valve member over its full stroke, and the duty cycle of the input voltage is varied, provided that $T_0$ is absolutely greater than $T_3$. It will be seen from FIG. 7A that the effective current value $I_F$ is substantially exactly proportional to the duty cycle. The effective value $I_F$ of current supplied to the coil of the electromagnetic valve and the stroke S of the plunger or needle valve member of the electromagnetic valve have also a proportional relation as shown in FIG. 7B. FIG. 7C is a graph showing the relation between the duty cycle D of the input voltage and the stroke S of the plunger or needle valve member of the electromagnetic valve, and it will be seen that there is also a proportional relation therebetween like FIGS. 7A and 7B. However, as described with reference to FIGS. 4C, 4D and FIGS. 6A, 6B, 6C, the very small amplitude of vibration ($W_1$, $W_2$, $W_3$) is depicted in regard to the case of $T_0=T_3$ instead of $T_0>>T_3$ in order to exaggerate the vibration amplitude from the standpoint of preparation of a drawing which facilitates the understanding of the basic principle of the present invention.

Figure 8:
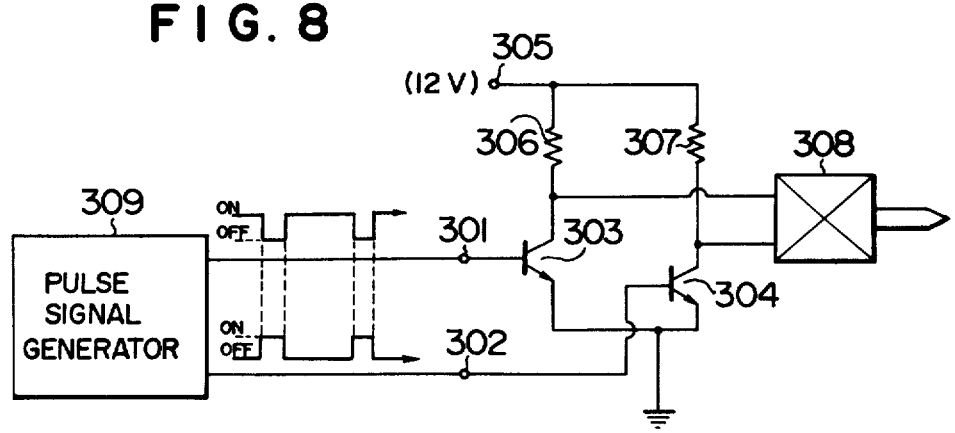
FIG. 8 is a circuit diagram of another embodiment of the present invention for controlling an electromechanical transducer or a proportional electromagnetic valve.
Figure 9:
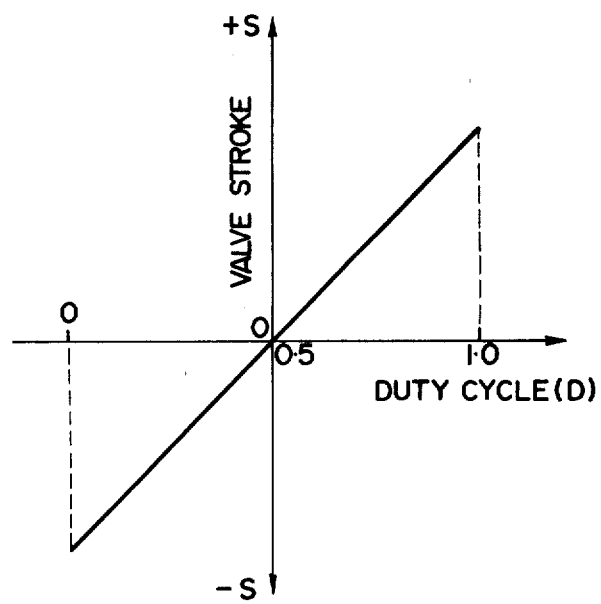
FIG. 9 is a graph showing the relation between the duty cycle and the stroke of the plunger of the proportional electromagnetic valve controlled by the control device shown in FIG. 8.

FIG. 8 is a circuit diagram of another embodiment of the control device according to the present invention. Referring to FIG. 8, two pulse signals having exactly opposite duty cycles are generated by a known pulse signal generator 309 to be applied to a pair of signal input terminals 301 and 302 respectively. The on-state of the first pulse signal applied to the input terminal 301 is, for example, 70% of one cycle, while that of the second pulse signal applied to the input terminal 302 is, for example, 30% of one cycle as seen in FIG. 8. Thus, there is a ratio of 7:3 between the on-state period of the voltage applied to the base of a transistor 303 and the on-state period of the voltage applied to the base of another transistor 304, and apparently, 70% of current is supplied from a power supply terminal 305 of 12 volts to a proportional electromagnetic valve 308 through a resistor 307 and flows to the transistor 303. On the other hand, the remaining 30% of current is supplied to the proportional electromagnetic valve 308 through another resistor 306 and flows to the transistor 304. When, conversely, the on-state period of the input voltage applied to the base of the transistor 304 is longer than that of the input voltage applied to the base of the transistor 303, the proportion of current supplied to the coil of the electromagnetic valve is apparently greater in the former case than in the latter. Therefore, when the ratio between the period of current flow to the transistor 303 and that to the transistor 304 is 7:3, the plunger or needle valve member of the electromagnetic valve is displaced to make its full stroke in the positive and negative directions at the rates of 70% and 30% respectively of the total period. However, due to the fact that the input voltage is actually turned on-off at a period sufficiently shorter than the minimum response time required for the full stroke (the maximum stroke in the positive or negative direction from the neutral position) of the plunger or needle valve member of the electromagnetic valve, the plunger or needle valve member of the electromagnetic valve makes an average stroke in the positive direction which meets the ratio above described. FIG. 9 shows the stroke characteristic of the electromagnetic valve when the ratio between the duty cycles of the two input signals is varied in the manner described. The positive direction portion of the horizontal axis in FIG. 9 represents the duty cycle of the voltage applied to the input terminal 301, while the negative direction portion of the horizontal axis represents the duty cycle of the voltage applied to the input terminal 302. The duty cycle $D_{302}$ of the voltage applied to the input terminal 302 is $D_{302}=1$ when the duty cycle $D_{301}$ of the voltage applied to the input terminal 301 is $D_{301}=0$, and in this case, the current flows entirely to the transistor 304 to maintain the plunger or needle valve member of the electromagnetic valve at the position displaced over its full stroke in the negative direction. On the other hand, $D_{302}=0$ when $D_{301}=1$, and in such a case, the current flows entirely to the transistor 303 to maintain the plunger or needle valve member at the position displaced over its full stroke in the position direction. When $D_{301}=0.5$ and $D_{302}=0.5$, the plunger or needle valve member of the electromagnetic valve is maintained at the neutral position 0 between the positive stroke $+S$ and the negative stroke $-S$.

It will be understood from the above description that the control device shown in FIG. 8 comprises a pair of switching elements of respectively opposite on-off states for the on-off of inputs applied thereto, so that the flowing direction of current supplied to the coil of the electromagnetic valve can be varied depending on the ratio between the duty cycles of the inputs applied to these two switching elements, and the plunger or needle valve member of the electromagnetic valve can make both the positive stroke and the negative stroke. It is apparent that the stroke characteristic shown in FIG. 9 is similar to that shown in FIG. 7C in that it includes a very small vibratory stroke component W which is effective in obviating the hysteresis of the stroke encountered hitherto. The current supplied to the coil of the electromagnetic valve must be stabilized in order to ensure the accuracy of the proportional relation shown in FIGS. 7C and 9. Provision of a battery will generally satisfy this requirement, but it is desirable to provide a constant-voltage source or a constant-current source in order to further improve the accuracy of the proportional relation.

One of the features of the embodiment shown in FIGS. 8 and 9 is that the safety can be ensured when the element, for example, the needle valve member is arranged to be restored to a suitable least dangerous position, (for example, the neutral position 0 in FIG. 9) in the event of a dangerous situation in which the coil of the electromagnetic valve is not properly energized due to failure of the control circuit.

FIGS. 10 to 15 illustrate preferred applications of the control device of the present invention to the control of proportional electromagnetic valves in various control systems. Therefore, the drawings and related explanations will be briefly described.

Figure 10:
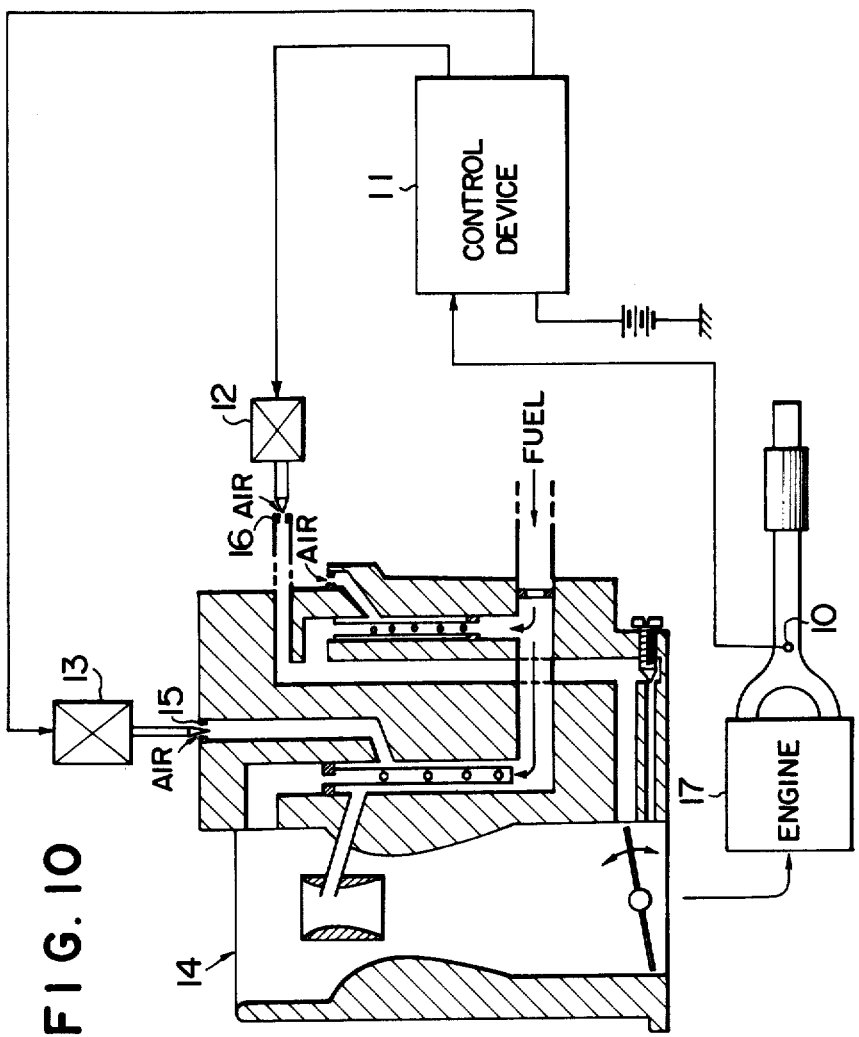

FIG. 10 shows diagrammatically a control system which employs proportional electromechanical transducers as actuating means for the closed-loop air-fuel ratio control in a carburetor utilizing a ternary catalyst. The oxygen concentration in the exhaust gas of an internal combustion engine 17 is detected by an oxygen probe or detector 10, and the output signal of the detector 10 is applied to the control device of the present invention shown by the reference numeral 11. The control device 11 controls proportional electromagnetic valves 12 and 13 which control the open areas of a slow air bleed 15 and a main air bleed 16 in a carburetor 14 respectively, so that the air-fuel ratio of the air-fuel mixture supplied from the carburetor 14 to the engine 17 can be controlled to be substantially equal to the ideal air-fuel ratio. For the control of the air-fuel ratio, the open areas of various kinds of fuel metering jets including a main fuel jet and a slow fuel jet may be controlled in lieu of the air bleeds above described so as to equally effectively attain the purpose. In a prior art control system employing such proportional electromagnetic valves as actuating means, the air-fuel ratio has been controlled by a control circuit which makes digital processing of an output signal of an oxygen probe or detector and converts the digital signal into an analog signal which is applied to the proportional electromagnetic valves after being amplified so as to control the stroke positions of the needle valve members of the proportional electromagnetic valves thereby varying the open areas of the fuel metering jets. In contrast to the prior art manner of control, the electromechanical transducer control device according to the present invention, which includes the control circuit for controlling the duty cycle of a high-frequency input voltage, is advantageous in that it can control such proportional electromagnetic valves by a digital signal output of the control circuit.

Therefore, the present invention eliminates the D-A converter and the converter output amplifier included in the prior art control circuit. Various advantages are thus provided which include the reduction in the cost and the improvement in the reliability, owing to the reduction of the number of electronic parts including the power transistor. In a prior art control system employing a proportional electromagnetic valve, the stroke position of the needle valve member of the proportional electromagnetic valve has been varied by controlling the quantity of analog current. Thus, according to such a control method, the proportional electromagnetic valve has tended to operate with the so-called hysteresis characteristic such that the needle valve member is not displaced to the stroke position corresponding to the quantity of analog current due to the state friction against the movement of the needle valve member of the electromagnetic valve. In the closed-loop air-fuel ratio control system, the air-fuel ratio must be controlled to be very close to the ideal air-fuel ratio of about $A/F=14.7\pm0.2$ in order that the ternary catalyst can exhibit the exhaust gas purification efficiency of more than about 90% for each of CO, HC and NOx. The control allowance for the air-fuel ratio A/F is limited to a very small value of about $\pm0.2$, because a variation of the air-fuel ratio beyond this limit results in a sharp reduction in the purification efficiency of the ternary catalyst. Therefore, the presence of hysteresis in the stroke characteristic of the electromagnetic valve results in impossibility of controlling the air-fuel ratio to within the very small control allowance range above specified, and it becomes inevitable to operate the engine in the air-fuel ratio region in which the exhaust gas purification efficiency of the ternary catalyst is considerably reduced. This leads to impossibility of removal of toxic components of the exhaust gas with the desired high efficiency.

In sharp contrast to the prior art control system, the desired control can be achieved in the control system employing the electromechanical transducer control device according to the present invention. As described in detail with reference to FIGS. 6A, 6B and 6C, and as also additionally described with reference to FIG. 7C and FIG. 9, the proportional electromagnetic valve operates with a stroke characteristic includes a very small vibratory stroke component W as shown in FIG. 7C and FIG. 9, and this very small vibratory stroke component W acts to absorb the static friction against the movement of the plunger or needle valve member of the electromagnetic valve so that the source of the hysteresis can be substantially completely eliminated to substantially completely obviate the hysteresis in the stroke characteristic. Therefore, the proper mechanical quantity, that is, the stroke characteristic corresponding exactly to the instruction provided by the instruction signal applied from the control circuit can be obtained, and the delicate control for limiting the air-fuel ratio A/F to within the control allowance range of about ±0.2 can be attained to permit purification of the exhaust gas with the desired high efficiency of more than about 90% for each of CO, HC and NOx.

Figure 11:
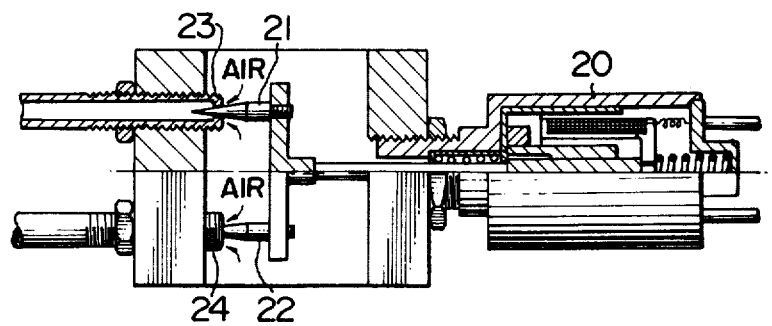

FIG. 11 shows part of a control system similar to that shown in FIG. 10, but in which a single proportional electromagnetic valve is used for controlling the open areas of a plurality of metering jets provided in a carburetor for the control of the air-fuel ratio. Referring to FIG. 11, a proportional electromagnetic valve 20 actuates a pair of needle valve members 21 and 22 simultaneously for simultaneously controlling the open areas of associated metering jets 23 and 24 at their predetermined values. The electromechanical transducer control device according to the present invention is also equally effectively applicable to such a control system. Especially when an arrangement as shown in FIG. 11 is employed, the needle value members tend to encounter a great frictional resistance by engagement with the openings of the associated metering jets, and the degree of hysteresis in the stroke characteristic tends to become greater than when a needle valve member is associated with a metering jet as shown in FIG. 10. The notable effect of the present invention is more markedly exhibited when applied to such a control system.

Figure 12:
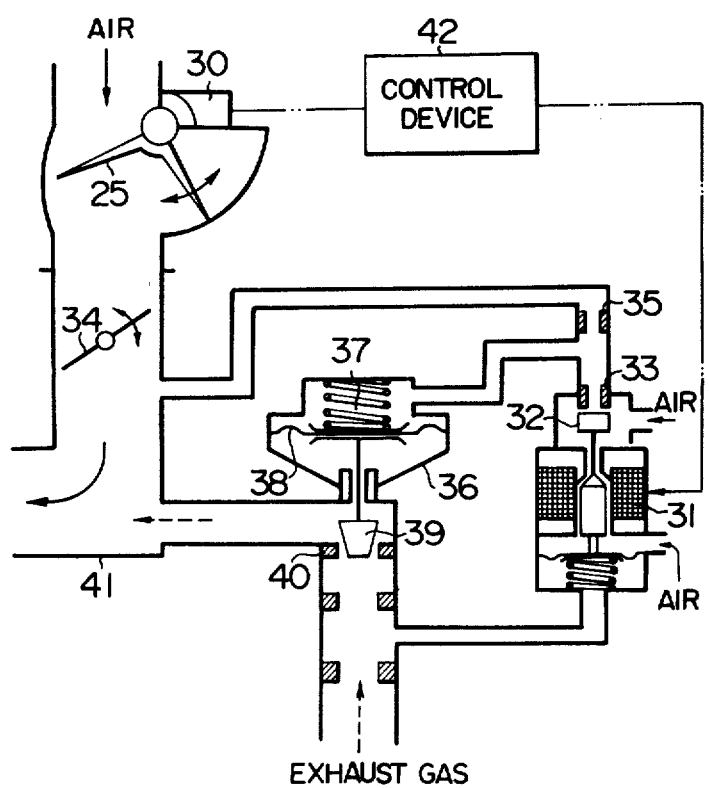

FIG. 12 shows diagrammatically an engine combustion control system provided with a microcomputer, in which the electromechanical transducer control device according to the present invention is employed as an actuating means for the control of the recycled quantity of the exhaust gas of an internal combustion engine. The recycled quantity of the exhaust gas must be controlled to be optimum within a range in which the engine parameters such as the output and drivability and the desired purification or removal of NOx in the exhaust gas are both satisfied for all the operating conditions of the engine. In the control system shown in FIG. 12, a detector 30 detects the angular position of rotation of an air quantity regulating valve 25 to detect the quantity of intake air supplied to the engine, and the output signal of this detector 30 is applied to a control device 42 to be converted into a digital signal required for operating a proportional electromagnetic valve 31 in a manner as described with reference to the control device of the present invention. This digital signal controls the proportional electromagnetic valve 31, and a flat valve member 32 connected with the plunger of this electromagnetic valve 31 is actuated in turn so as to control the gap between a flat valve seat 33 and the flat valve member 32. As a consequence of the control of the gap between the valve seat 33 and the flat valve member 32, the suction negative pressure derived from the downstream side of a throttle valve 34 and supplied into a diaphragm chamber 37 of an EGR (exhaust gas recycle) valve 36 (commonly called a constant flow-rate valve) through an orifice 35 is varied in proportional relation to the quantity of intake air, and this controlled negative pressure is used as a power source for displacing a diaphragm 38. A needle valve member 39 connected with the diaphragm 38 is displaced to vary the open area or gap between this needle valve member 39 and an associated valve seat 40 thereby controlling the quantity of exhaust gas recycled into an intake duct 41. In order that the engine output (drivability) and the desired purification of NOx in the exhaust gas can be both satisfied, it is necessary to control the recycled exhaust quantity with an accuracy of about ±5% in all the operating conditions of the engine (the operating region of the ECR valve). Therefore, the prior art method of controlling the proportional electromagnetic valve, according to which the stroke position of the valve member is controlled depending on the analog current quantity, has been defective in that the hysteresis appearing in the stroke characteristic due to the frictional resistance encountered by the plunger or needle valve member of the electromagnetic valve makes difficult to obtain the control accuracy above specified, and the recycled quantity of the exhaust gas tends to be controlled at a value which affects adversely either the engine output requirement or the NOx purification requirement. In sharp contrast to the prior art manner of control, the employment of the electromechanical transducer control device according to the present invention in such a control system is effective in substantially completely obviating the hysteresis in the stroke characteristic of the electromagnetic valve as described in detail with reference to FIGS. 6A, 6B, 6C, FIG. 7C and FIG. 9. Therefore, the mechanical quantity is properly proportional to the instruction provided by the instruction signal applied from the control circuit to maintain the accuracy of control to within the very small range above specified, so that the engine output requirement and the NOx purification requirement can both be satisfied.

It is apparent that the effect of application of the electromechanical transducer control device of the present invention as an actuating means for the air-fuel ratio control in an engine combustion control system provided with a microcomputer is similar to that exhibited by its application to the control system described in detail with reference to FIG. 10.

The electromechanical transducer control device according to the present invention is also similarly effectively applicable to various control systems as described below.

Figure 13:
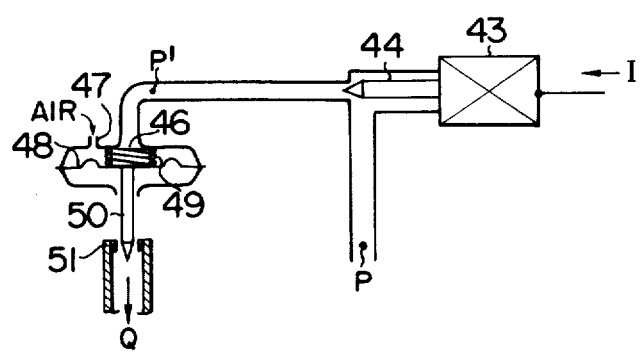

FIG. 13 shows part of a control system in which the analog mechanical quantity or the stroke of the plunger or needle valve member of a proportional electromagnetic valve is suitably varied to control a pressure, for example, a suction negative pressure of an internal combustion engine, and this pressure is used as a source of actuating a member such as a diaphragm or a piston which converts a pressure into reciprocating movement of an element connected therewith so as to control the flow rate of fluid as desired. In such a case, therefore, any substantial force is not required for causing the displacement of the diaphragm or piston. However, according to the prior art manner of control in which the analog current quantity is varied to vary the stroke of the plunger or needle valve member of the electromagnetic valve, the resulting hysteresis exerts a great adverse effect on the stroke of the diaphragm or piston.

Such a problem is completely obviated when the method of controlling the proportional electromagnetic valve, that is, the electromechanical transducer control device according to the present invention is applied to this kind of control, since no hysteresis occurs substantially in the stroke characteristic of the electromagnetic valve.

Referring to FIG. 13, a needle valve member 44 of a proportional electromagnetic valve 43 energized by an input voltage having a controlled duty cycle as described hereinbefore is used to control the area of a passage 45 of a pressure P so that a controlled pressure P' can be supplied into a diaphragm chamber 46 containing a diaphragm 48. In response to the application of this controlled pressure P', the diaphragm 48 is displaced to a position at which the force of a return spring 49 counterbalances the pressure P'. A needle valve member 50 fixed to the diaphragm 48 makes corresponding movement to vary the open area of an orifice 51 which controls the flow rate of air. The reference numeral 47 designates a throttle. This control method is however defective in that a variation of the pressure P results in a corresponding variation of the pressure P', and the value of current I supplied to the proportional electromagnetic valve 43 cannot solely determine the value of pressure P'. Such a defect is obviated by a control method shown in FIG. 14.

Figure 14:
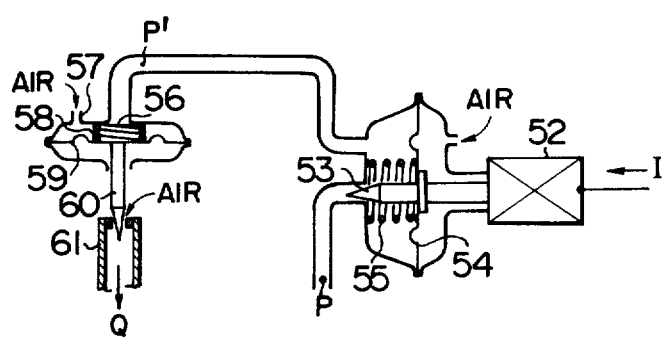

Referring to FIG. 14, a negative pressure P is applied to a diaphragm 54 to bias the diaphragm 54 to a position at which the force of a return spring 55 counterbalances the pressure P. A needle valve member 53 of a proportional electromagnetic valve 52 is fixed to the diaphragm 54 to control the open area of the passage of the pressure P so that a controlled vacuum P' can be supplied to a diaphragm chamber 56 containing a diaphragm 59. This negative pressure P' is controlled to be constant in a manner as described below. Suppose that the value of the negative pressure P varies in the state in which the negative pressure P' is maintained at a predetermined value. Suppose, for example, that the negative pressure P increases from the previous value. Then, the area of the vacuum passage is narrowed by the needle valve member 53 by the amount corresponding to the increase in the pressure differential across the metering part, so that the quantity of air passing through the metering part can be controlled to be constant. Therefore, the negative pressure acting upon the diaphragm 59 in the vacuum chamber 56 can be maintained constant. The reference numerals 57 and 58 designate a throttle and a return spring respectively. Thus, the proportional electromagnetic valve 52 operates as a means for maintaining constant the negative pressure P', so that the force generated in the electromagnetic valve 52 for actuating the needle valve member 53 can solely be utilized for controlling the negative pressure P' without regard to a variation of the value of negative pressure P. Thus, the flow rate of air can be controlled by displacing a needle valve member 60 connected with the diaphragm 59 in proportional relation to the variation of the negative pressure P' thereby varying the open area of an orifice 61 by the needle valve member 60. A highly accurate flow rate control can be achieved by the application of the electromechanical transducer control device according to the present invention to such a control system too, since the present invention can substantially complete obviate the undesirable hysteresis in the mechanical quantity of the kind described.

Figure 15:
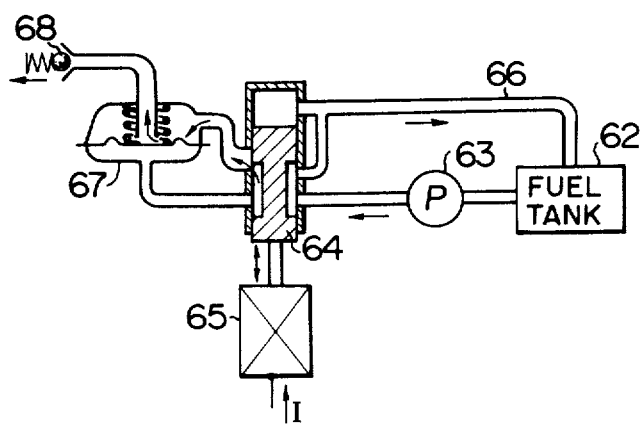

FIG. 15 shows another application of the electromechanical transducer control device according to the present invention as actuating means for the control of the flow rate of fuel in a mechanical fuel injection system. Referring to FIG. 15, fuel is pumped out of a fuel tank 62 by a pump 63 to be supplied under pressure to a metering valve 64, and a proportional electromagnetic valve 65 actuates the metering valve 64 so that the fuel can be supplied at a flow rate providing a suitable air-fuel ratio between it and the flow rate of air detected by an engine intake air flow detecting means. A pressure regulating valve 67 acts to maintain constant the pressure acting upon an injection valve 68. The reference numeral 66 designates a return pipe for the fuel. In the prior art control system, the air flow-rate signal output of the engine intake air flow detector is transmitted to the metering valve 64 through a mechanical linkage. Thus, the prior art control system has been defective in that it is subject to structural limitations, and the type of the air flow detector is also limited. Employment of the electromechanical transducer control device according to the present invention as an actuating means in such a system obviates all these problems. The prior art control system has also been defective in that the factors including the manufacturing tolerance of the dimensions of the link connections render it difficult to attain the reproducibility of the fuel control characteristic for the individual products since the air flow-rate signal is transmitted to the metering valve by means of the mechanical linkage. Application of the electromechanical transducer control device according to the present invention to such a prior art mechanical flow-rate control system for the purpose of eliminating fluctuation of the flow rate of fuel is effective in that the position of the metering valve can be accurately corrected to improve the reproducibility of the fuel control characteristic.

The present invention provides the following advantages:

(1) In the present invention, an electromechanical transducer such as a proportional electromagnetic valve which provides a mechanical output corresponding to an electrical input is energized by a digital electrical signal. Therefore, a D-A converter and a converter output amplifier required for a prior control system using a transducer of this kind are now unnecessary. Thus, the cost can be reduced, and the number of electronic parts including especially, the power transistor, can also be reduced to improve the reliability of the control circuit.

(2) On-off of the electrical input is repeated at a constant period shorter than the minimum response time required for the full stroke of the plunger or needle valve member displaced by the mechanical output of the electromechanical transducer, and the duty cycle of the electrical input is controlled so as to provide an analog mechanical output or quantity. This analog mechanical quantity includes a very small digital mechanical quantity component or a very small vibratory stroke component W which is effective in eliminating the hysteresis occuring in the mechanical output of the transducer.

(3) Two switching elements are provided for the cyclic on-off of the electrical quantity applied to the electromechanical transducer, and electrical signals having opposite duty cycles are applied to these two switching elements respectively. Therefore, the transducer provides an analog mechanical output or quantity of both the positive direction and the negative direction depending on the ratio between the duty cycles of the electrical inputs applied to the respective switching elements.

(4) Application of the electromechanical transducer control device as an actuating means for the closed-loop air-fuel ratio control in a carburetor utilizing a ternary catalyst can improve the accuracy of control of the air-fuel ratio, reduce the cost of the control circuit and improve the reliability of the control circuit.

(5) Application of the electromechanical transducer control device as an actuating means for the control of the recycled exhaust gas quantity and also for the control of the air-fuel ratio in an engine combustion control system provided with a microcomputer can improve the accuracy of control of the recycled exhaust gas quantity and air-fuel ratio, reduce the cost of the control circuit, and improve the reliability of the control circuit.

Figure 1:
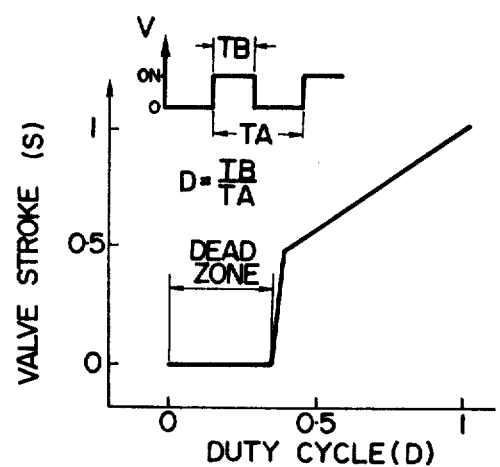
FIG. 1 is a graph showing the operating characteristic of an on-off electromagnetic valve to illustrate the presence of a dead zone.

(6) One of the drawbacks of an on-off electromagnetic valve is the dead zone (FIG. 1) appearing due to application of an electrical input having a small duty cycle. Such dead zone can be obviated.

(7) Another drawback of the on-off electromagnetic valve is the crashing sound obversed during the return movement of the sliding parts making reciprocating movement between the minimum and maximum points of the full stroke. Such sound can be substantially obviated by employing a proportional electromagnetic valve and controlling the duty cycle of an electrical input thereto. The material wear observed in the proportional electromagnetic value is also less than that in the on-off electromagnetic valve.

(8) The mechanical output of the electromechanical transducer includes a very small digital mechanical quantity or a very small vibratory stroke component W of high frequency as described hereinbefore. Thus, the transducer is not substantially adversely affected by disturbance such as externally imparted vibration since a great electromagnetic force is generated instantaneously.

We claim:

1. A device for controlling an electromechanical transducer comprising:
   an electromagnetic valve including an electromagnetic coil and a movable member displaced in proportional relation to an electrical input signal applied to said electromagnetic coil thereby driving a controlled element;
   at least one switching means for chopping the electrical input signal applied to said electromagnetic coil; and
   means for generating an electrical pulse signal for triggering said switching means,
   wherein the electrical pulse signal generated by said pulse generating means and applied to said switching means has a constant period shorter than the minimum response time required for said movable member to make its predetermined full stroke, and the duty cycle of the electrical pulse signal applied to said switching means is varied to cause displacement of said movable member in proportional relation to the variation of the duty cycle, and
   wherein said switching means comprises two switching elements which are arranged so that said movable member is urged in a first direction when one of said switching elements is turned on, while said movable member is urged in a second direction opposite to said first direction when the other of said switching elements is turned on, and one of said switching elements is maintained in its off-state when the other is placed in its on-state.

2. A control device as claimed in claim 1, wherein the stroke of said movable member varies in proportional relation to the variation of said duty cycle, and a very small vibratory stroke component is superposed on the stroke of said movable member.

3. A control device as claimed in claim 1, wherein each of said two switching elements is a transistor having two major electrodes and one control electrode, said two transistors being connected at their first major electrodes across the two terminals of said electromagnetic coil and also with a power source, at their second major electrodes with ground, and at their control electrodes with the two outputs of said pulse generating means respectively, said two pulse signals having their on-off periods inverted relative to each other appearing from said two outputs of said pulse generating means.

4. A control device for controlling fluid flow in an internal combustion engine, comprising:
   a valve for controlling fluid flow;
   means for detecting the operating condition of said internal combustion engine;
   an electromagnetic device including an electromagnetic coil and a movable member to be displaced in proportional relation to electric current applied to said electromagnetic coil thereby driving said valve;
   an electric source for energizing said electromagnetic coil;
   at least one switching means for chopping current supplied from said source to said electromagnetic coil;
   means for generating an electrical pulse signal composed of a plurality of pulses for actuating said switching means, said pulse signal generating means comprising a digital computer for receiving the output signal from said detecting means as an input signal, and for processing quantized digital signals and for converting the quantized digital signals to pulse signals, each of said pulses having a constant period of 5–15 msec, the constant period being shorter than a minimum period of time required for said movable member to be moved by its predetermined full stroke and sufficient for said movable member to be moved; and
   means for changing the duty cycle of each of said pulses applied to said switching means,
   wherein said movable member is displaced in proportional relation to the duty cycle changed by said duty cycle changing means.

5. A control device as claimed in claim 4, wherein said valve for controlling fluid flow is disposed for controlling an air flow rate flowing into a carburetor of the internal combustion engine.

6. A control device as claimed in claim 4, wherein said movable member is provided with a plunger having at least one needle valve mounted thereon, and a coil spring is provided for energizing said plunger with a constant force.

7. A control device as claimed in claim 6, wherein two needle valves are mounted on said plunger.

8. A control device as claimed in claim 7, wherein said plurality of pulses for actuating said switching means serve for superimposing a very small vibratory stroke component on the stroke of said movable member.

9. A control device as claimed in claim 4 or claim 7, wherein said digital computer is a microcomputer.

10. A control device for controlling fluid flow in an internal combustion engine, comprising:
- a valve for controlling fluid flow;
- means for detecting the operating condition of said internal combustion engine;
- an electromagnetic device including an electromagnetic coil and a movable member to be displaced in proportional relation to electric current applied to said electromagnetic coil thereby driving said valve;
- an electric source for energizing said electromagnetic coil;
- at least one switching means for chopping current supplied from said source to said electromagnetic coil;
- means for generating an electrical pulse signal composed of a plurality of pulses for actuating said switching means, said pulse signal generating means comprising a digital computer for receiving the output signal from said detecting means as an input signal, and for processing quantized digital signals and for converting the quantized digital signals to pulse signals, each of said pulses having a constant period, the constant period being shorter than a minimum period of time required for the movable member to be moved by its predetermined full stroke and the constant period being one of equal to and longer than a period for said movable member to be moved without mechanical hysteresis; and
- means for changing the duty cycle of each of said pulses applied to said switching means,
- wherein said movable member is displaced in proportional relation to the duty cycle changed by said duty cycle changing means.

11. A control device as claimed in claim 10, wherein the minimum period of time required for said movable member to be moved by its predetermined full stroke is the time $T_O$ and the period of time for said movable member to be moved without mechanical hysteresis is $T_O/4$.

12. A control device as claimed in claim 11, wherein the minimum time period $T_O$ is the time lag of the electromagnetic device which is 15–20 msec, and the time period $T_O/4$ for said movable member to be moved without mechanical hysteresis is about 5 msec.

* * * * *